Dec. 24, 1929.  W. TIMSON  1,740,798
AUTOMATIC WEIGHING DEVICE
Filed Aug. 29, 1927
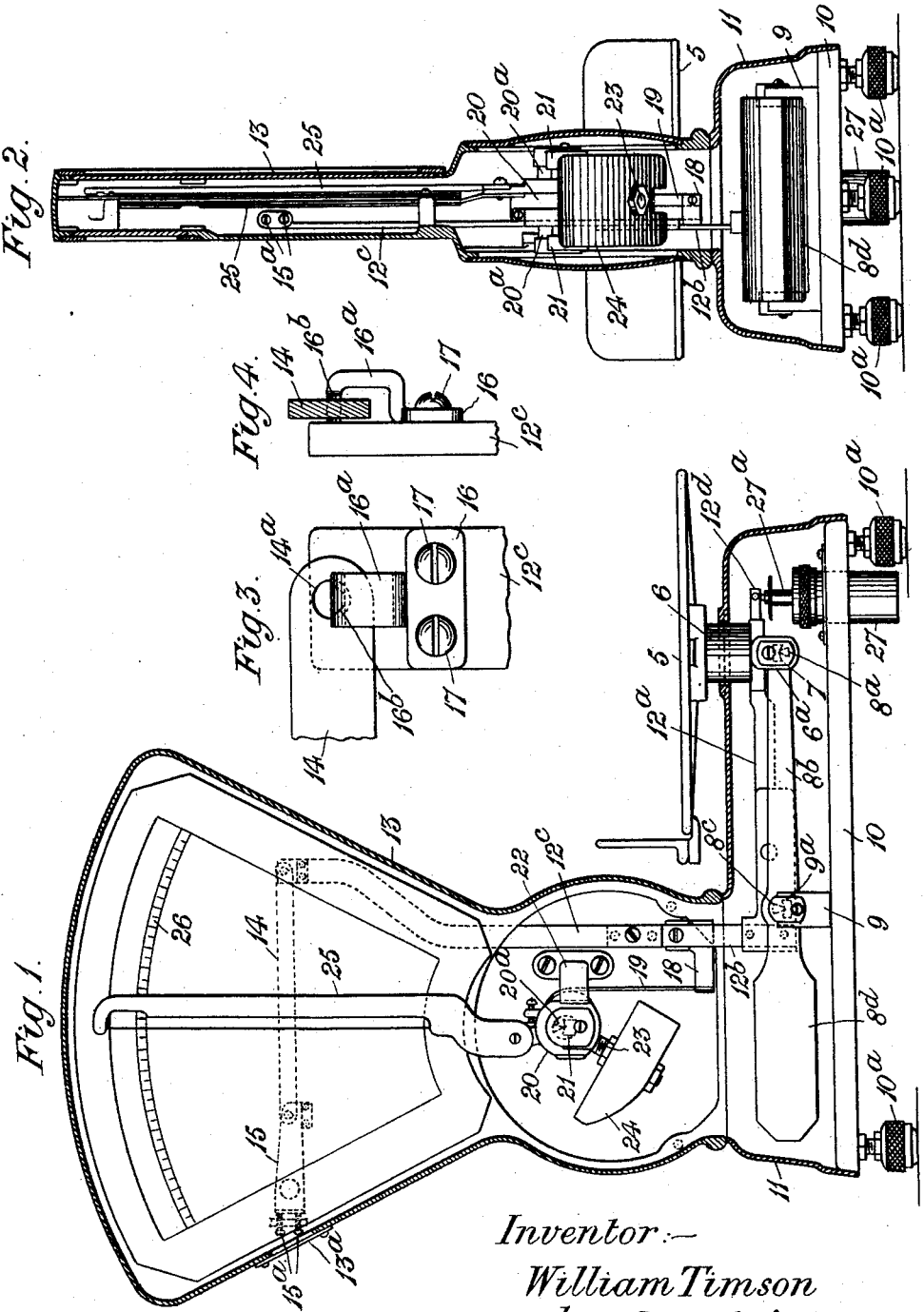
Inventor:—
William Timson
by George E. Folkes.
his Attorney Patented Dec. 24, 1929

1,740,798

UNITED STATES PATENT OFFICE

WILLIAM TIMSON, OF BIRMINGHAM, ENGLAND, ASSIGNOR TO W. & T. AVERY LIMITED, OF BIRMINGHAM, ENGLAND

AUTOMATIC WEIGHING DEVICE

Application filed August 29, 1927, Serial No. 216,277, and in Great Britain May 12, 1927.

This invention has reference to improvements in or relating to fully automatic weighing apparatus and has for its object the provision of an automatic weighing apparatus of the fan type which is simple in construction, efficient in operation and capable of being produced at a relatively low cost.

The invention consists of an improved automatic weighing apparatus of the kind hereinbefore referred to wherein a goods plate supporting means is mounted upon a lever preferably of the first order and has connection through a check stay to a pivotally mounted link located within the housing of the indicating mechanism said check stay being provided intermediate its length with a bracket or projection adapted to be connected to a resistant mechanism of known construction. The invention also resides in the method of pivotally connecting the link to the check stay and to the link supporting means.

The invention will now be described in connection with the accompanying sheet of drawings wherein:—

Figure 1 is a front elevation of the weighing scale with the base and indicator housing shewn in section.

Figure 2 is a part sectional end elevation of the scale seen in Figure 1.

Figure 3 is a detail view to an enlarged scale of the means of pivotally connecting the link to the check stay, and Figure 4 is an end view of Figure 3.

The goods plate 5 is mounted on the upper end of a cylindrical pillar 6 the lower portion whereof terminates in a substantially U shaped bracket the downwardly depending arms $6^a$ whereof are provided with bearing blocks 7 which co-operate with knife edges $8^a$ fixed adjacent the end of the arm $8^b$ of a lever of the first order. This lever is fulcrumed on knife edges $8^c$ supported in bearings $9^a$ carried by brackets 9 secured to the base 10 adjacent the centre thereof whereby the aforesaid lever may be wholly located within a base housing 11 secured to the base 10. The other arm $8^d$ of the lever is loaded and constitutes a portion of the weighing resistant. The base 10 has secured on the underside thereof adjustable feet $10^a$ for permitting of the accurate levelling of the scale in known manner.

Secured to the pillar 6 is one end of the horizontal section $12^a$ of a check stay, the other end of the said horizontal section being attached to a vertically disposed section $12^b$ which, in turn, is connected to a further vertically disposed portion $12^c$. The upper section of the section $12^a$ is cranked so that the whole of the said section as well as the section $12^b$ may be disposed in a housing 13 within which is located the indicating mechanism, the said housing 13 being supported on the base housing 12 and disposed to one end thereof in the ordinary manner. The upper end of the section $12^c$ of the check stay is pivotally connected to one end of a check link 14 the other end whereof is pivotally connected to a bracket 15 pivotally connected to a lug carried by the housing 13. The bracket 15 cooperates with a pair of set screws $15^a$ which admit of the adjustment of the said bracket 15 in a vertical plane as may be required. In order to permit of access to the screws $15^a$ the indicator housing 13 is provided with an aperture adjacent the said screws, the aperture normally being closed by a readily detachable plate $13^a$.

The check stay and the check link 14 have secured thereto by means of screws 17 bent sheet metal members 16 the upper portions of which are cranked upwardly and then inwardly the inwardly turned portion $16^b$ being formed of a substantially triangular shape in cross section as is clearly seen in Figure 3. The inwardly turned portions $16^b$ are passed through circular apertures $14^a$ formed adjacent the ends of the check link said apertures $14^a$ being of a diameter substantially equal to the length of the base of the triangular section whereby the apices of the base of the said section $16^b$ contact with the walls of the aperture and constitute line bearings.

Secured to the section $12^b$ of the check stay is a bracket 18 to the end whereof is attached the lower end of a flexible ribbon 19 the other end of which is secured to the periphery of a cam 20 mounted on knife edges $20^a$ supported in bearing blocks 21 supported by a bracket 22 fixed to the housing 13. The cam 20 has attached thereto a screwed rod 23 upon which is adjustably mounted a pendulous resistant 24. The cam 20 has attached thereto also indicating pointers 25 which register with a graduated chart 26 mounted in the upper portion of the indicator housing 13 in the normal manner.

Disposed within an aperture formed in the base 10 is a dashpot 27 the piston 27a whereof has a pivotal connection with an extension 12d of the horizontal arm 12a of the check stay.

A scale constructed as hereinbefore described is simple in construction, efficient in operation and capable of being produced at a relatively low cost.

What I claim is:—

1. A fully automatic weighing apparatus of the fan type comprising a base, a lever fulcrumed on said base, a single scale plate, a supporting means for said scale plate mounted on one end of said lever, a check stay comprising a horizontal section and a plurality of vertical sections the horizontal section having connection with the aforesaid goods plate supporting means, a housing, a pendulous resistant mechanism located in said housing, a check link pivotally mounted in the upper portion of said housing said check link having a pivotal connection at one end with the upper end of the vertical portion of the check stay, a bracket secured to one end of one of the vertical sections of the check stay and means for connecting the said bracket to the pendulous resistant mechanism.

2. A fully automatic weighting apparatus of the fan type comprising a base, a lever fulcrumed on said base, a single scale plate, a supporting means for said scale plate mounted on one end of said lever, a check stay comprising a horizontal section and a plurality of vertical sections the horizontal section having connection with the aforesaid goods plate supporting means, a housing, a pendulous resistant mechanism located in said housing, a check link pivotally mounted in the upper portion of said housing said check link having a pivotal connection at one end with the upper end of the vertical portion of the check stay, a bracket secured to one end of one of the vertical sections of the check stay, means for connecting the said bracket to the pendulous resistant mechanism, a pivotally mounted bracket for supporting the other end of the check link and means for adjusting the setting of the said bracket.

3. A fully automatic weighing apparatus of the fan type comprising a base, a base housing, a lever of the first order fulcrumed on said base and disposed within said base housing, a single scale plate, a supporting means pivotally mounted on one end of said lever, a check stay having a horizontal section and a plurality of vertically disposed sections the horizontal section having connection with the aforesaid scale plate supporting means, an indicator housing, a pendulous resistant mechanism located within said housing, a check link disposed within the upper portion of said indicator housing said check link having a pivotal connection at one end with the upper end of one of the vertical portions of the check stay, a pivotally mounted bracket for supporting the other end of the check link, means for effecting the adjustment of said bracket, a projecting bracket secured to one end of the vertical sections of the check stay and means for connecting said projecting bracket to the aforesaid pendulous resistant mechanism.

4. A fully automatic weighing apparatus of the fan type comprising a base, a base housing, a lever of the first order fulcrumed on said base and disposed within said base housing, a single scale plate, a supporting means for said scale plate pivotally mounted on one end of said lever, a check stay having a horizontal section and a plurality of vertically disposed sections the horizontal section having connection with the aforesaid scale plate supporting means, an indicator housing, a pendulous resistant mechanism located within said housing, a check link disposed within the upper portion of said indicator housing said check link having a pivotal connection at one end with the upper end of the vertical portion of the check stay, a pivotally mounted bracket for supporting the other end of the check link, means for effecting the adjustment of said bracket, a projecting bracket secured to one end of one of the vertical sections of the check stay, means for connecting said projecting bracket to the aforesaid pendulous resistant mechanism, an extension on the horizontal section of the check stay and a dashpot mounted on the base of the piston rod of said dashpot having connection with the said extension in the check stay.

In testimony whereof I have signed my name to this specification.

WILLIAM TIMSON.